United States Patent [19]
Turchetti

[11] Patent Number: 5,858,228
[45] Date of Patent: Jan. 12, 1999

[54] SEPARATION FILTER WITH TURBINE GENERATING CONTROLLED TURBULENCE FOR SOLIDS SUSPENDED IN LIQUID

[76] Inventor: Attilio Turchetti, Via BR-060 Km. 213/233 74431-970, Guiania GO/BRA, Brazil

[21] Appl. No.: 272,695

[22] Filed: Jul. 8, 1994

Related U.S. Application Data

[63] Continuation-in-part of Ser. No. 258,515, Jun. 10, 1994.

[51] Int. Cl.[6] .................................................. B01D 29/62
[52] U.S. Cl. ........................... 210/249; 55/471; 210/408; 210/415; 210/512.3
[58] Field of Search ................................. 210/249, 360.1, 210/380.3, 435, 456, 497.01, 512.1, 512.3, 770, 409, 411, 414, 415, 408, 413; 55/467, 470, 471

[56] References Cited

U.S. PATENT DOCUMENTS

| | | | |
|---|---|---|---|
| 2,181,404 | 11/1939 | Koppitz et al. | 210/415 |
| 3,235,087 | 2/1966 | Andrews et al. | 210/415 |
| 4,997,578 | 3/1991 | Berggren | 210/770 |
| 5,009,795 | 4/1991 | Eichler | 210/415 |
| 5,133,860 | 7/1992 | Tai | 210/456 |

*Primary Examiner*—Joseph W. Drodge
*Attorney, Agent, or Firm*—Herbert Dubno

[57] ABSTRACT

A filter for suspensions with an impeller generating controlled turbulence for suspended solids, comprising an inclinable filter body 1 which shelters a filtrating element consisting of a filtrating sleeve (10) and an impeller (11) working together. The sleeve (10) is mounted on filter body (1) by means of supports (12) and it shelters a part of the impeller (11), comprising an axle (13) which is subject to a motor assembly (14), located outside body (1) and around which are mounted radial blades defining two phases: an inlet phase (15) and a processing phase (16), the latter being lodged inside the sleeve (10) and a washing device (31) for the sleeve (10). The inlet phase (15) comprises blades (20) in the form of a short pace propeller to give axial impulse, and no radial impulse, to the liquid to be filtrated. The processing phase (16) comprises blades in the form of a long pace propeller (21) to give impulse of great radial intensity, and small axial intensity, to the liquid. The blades (21) of the processing phase (16) provide a convex dragging surface (22) for the liquid and give impulse to the material to be filtrated, which is the result of tangential components to the convex surface. The system of forces on the liquid to be filtrated, coming from blades (21) in the form of a long pace propeller and from the convex dragging surface (22) of the processing phase (16) of the impeller (11) make the liquid move according to a vortex along the whole extent of sleeve (10), which is widened in the direction of the inlet ends towards the outlet end, providing a self-cleaning washing effect to sleeve (10).

16 Claims, 4 Drawing Sheets

SEPARATION FILTER WITH TURBINE GENERATING CONTROLLED TURBULENCE FOR SOLIDS SUSPENDED IN LIQUID

This application is a continuation-in-part of U.S. patent application Ser. No. 08/258,515, filed Jun. 10, 1994.

BACKGROUND OF THE INVENTION

1. Field of the Invention

The purpose of the present invention is a filter with an impeller belonging to the field of equipment for separating fluids or liquids and solids in suspension, which received original construction for providing controlled turbulence for solids, obtained with an impeller with adequate characteristics for impelling the liquid to be filtrated inside a filtrating sleeve and according to a vortex movement.

2. Description of Relevant Art

A filter for separating liquids and solids of products in suspension is already known such as, for example, fruit juices in general and others. The filter comprises a filter body, an end of which provides a feeding inlet for the product to be filtrated. The middle portion of said body contains a filtrating element, and a lower outlet for the filtrated material. The opposite end of said filter body provides an outlet for solids. The filter body is mounted on a carrying structure through articulations and an adjustable inclination device. The filtrating element comprises a filtrating sleeve, the inlet of which is close to the inlet of the filter body. The middle portion said sleeve shelters a portion of a winged impeller and the other end of the filtrating sleeve, is located at the outlet for solids of the filter body. The winged impeller is subject to an actuating assembly external to the filter body.

In the usual form of construction for this type of filter, its impeller is formed by two portions of different wings defining two phases, namely: an inlet phase located close to the inlet end of the filtrating sleeve, and consisting of a propeller to give an axial movement to the product to be filtrated; and a processing phase consisting of flat radial blades impelling the liquid radially against the filtrating sleeve. Completing the impeller, a self-cleaning device is provided for the filtrating sleeve, comprising, for example, a helicoidally wound-up thread or wire around the radial processing blades close to the inner face of the filtrating sleeve which mechanically drags the solid material retained in the sleeve towards the outlet thereof.

With reference to the utilization of such filter, it has many problems. One first problem concerns the fact that the liquid to be filtrated suffers a quick change of direction between the phases for the inlet and processing of the impeller—it passes from axial movement to radial movement—and is also subject to impacts against the inner surfaces of the impeller, thus causing a great loss of axial hydrodynamic impulse. The loss of impulse causes the liquid to be concentrated as it goes through the initial region of the filtrating sleeve. This brings about differentiated efforts to the sleeve and, depending on the material of its construction, there may occur elastic deformations to the detriment of a good performance. Only a small part of the filtrating area of the sleeve is effectively used in the processing of the material.

Another problem arising from the usual filter as described above, concerns the fact that the mechanical self-cleaning device, depending on the concentration level of the solid material suspended in the liquid, causes squeezing and crushing of the solids against the filtrating sleeve. This may cause chockings and wear and tear on the screen which are harmful to it and/or a certain malfunction of the equipment, thus making it operate rather forcedly.

SUMMARY OF THE INVENTION

Considering these problems and with a view to eliminating them, the present invention provides a separation filter with an impeller generating controlled turbulence for solids suspended in liquid. The impeller is formed by two portions of different blades defining respective phases, namely: an inlet phase, with blades in the form of a short pace propeller, to give axial impulse, and no radial impulse, to the liquid to be filtrated; and a processing phase with blades in the form of a long pace propeller to give impulse of great radial and small axial intensity to the liquid. Associated with the long pace propeller, said blades have a convex dragging surface for the liquid, which gives an impulse to the material to be filtrated and which is the result of tangential components to the convex surface, defining a system of forces which makes the liquid move according to a vortex along the whole extent of the filtrating sleeve, which widens in the direction of the inlet ends towards the outlet thereof.

This form of construction provides a solution for the problems arising from the usual similar filters since the loss of axial hydrodynamic impulse, between the two phases of the impeller is minimized. This prevents the liquid from being concentrated in the initial portion of the filtrating sleeve and makes it flow along the whole extent thereof, thus eliminating differentiated efforts and elastic deformation in the sleeve in relation to its filtrating capacity. Such a form of circulation of the liquid in the sleeve further favors effective use of the whole filtrating area thereof.

In the present construction, the turbine produces a self-cleaning washing effect on the filtrating sleeve which is carried out by the vortex movement of the liquid, which substitutes for the usual mechanical cleaning devices. Before going through the filtrating sleeve, the liquid slips along the inner face thereof, axially dragging the solids till they reach the outlet end.

This form of cleaning of the filtrating sleeve by washing prevents squeezing and crushing of solids against it and all the problems arising from these effects.

In the usual form of construction for this type of filter, the filtrating sleeve is firmly mounted on the filter body. Therefore, when the operation of the equipment is submitted to eventual efforts exceeding those normally used and resulting from the very dynamics of the filtrating operation, said filtering sleeve is expanded, showing elastic deformations and problems in its filtrating capacity and/or being torn off in some cases.

In the filter of the present invention, this problem is extensively solved by the very vortex movement of the liquid to be filtrated, which minimizes the impact thereof against the sleeve. In collaboration with such a flow of the liquid, the filtrating sleeve is fixed to the filter body by an elastic support. This elastic support keeps the filtrating sleeve under tension when it is affected by eventual internal overpressures because the support axially oscillates, thus allowing the sleeve to shrink to absorb the efforts, without undergoing significant elastic deformations and maintaining its filtrating capacity. When the internal overpressure on the sleeve ceases, said support returns to its original position to unshrink it and to retention it.

BRIEF DESCRIPTION OF THE DRAWINGS

The attached drawings show the separation filter, with the impeller generating controlled turbulence for solids suspended in liquid, which is the object of the present invention, in which.

DETAILED DESCRIPTION OF THE PREFERRED EMBODIMENT

Figure 1:
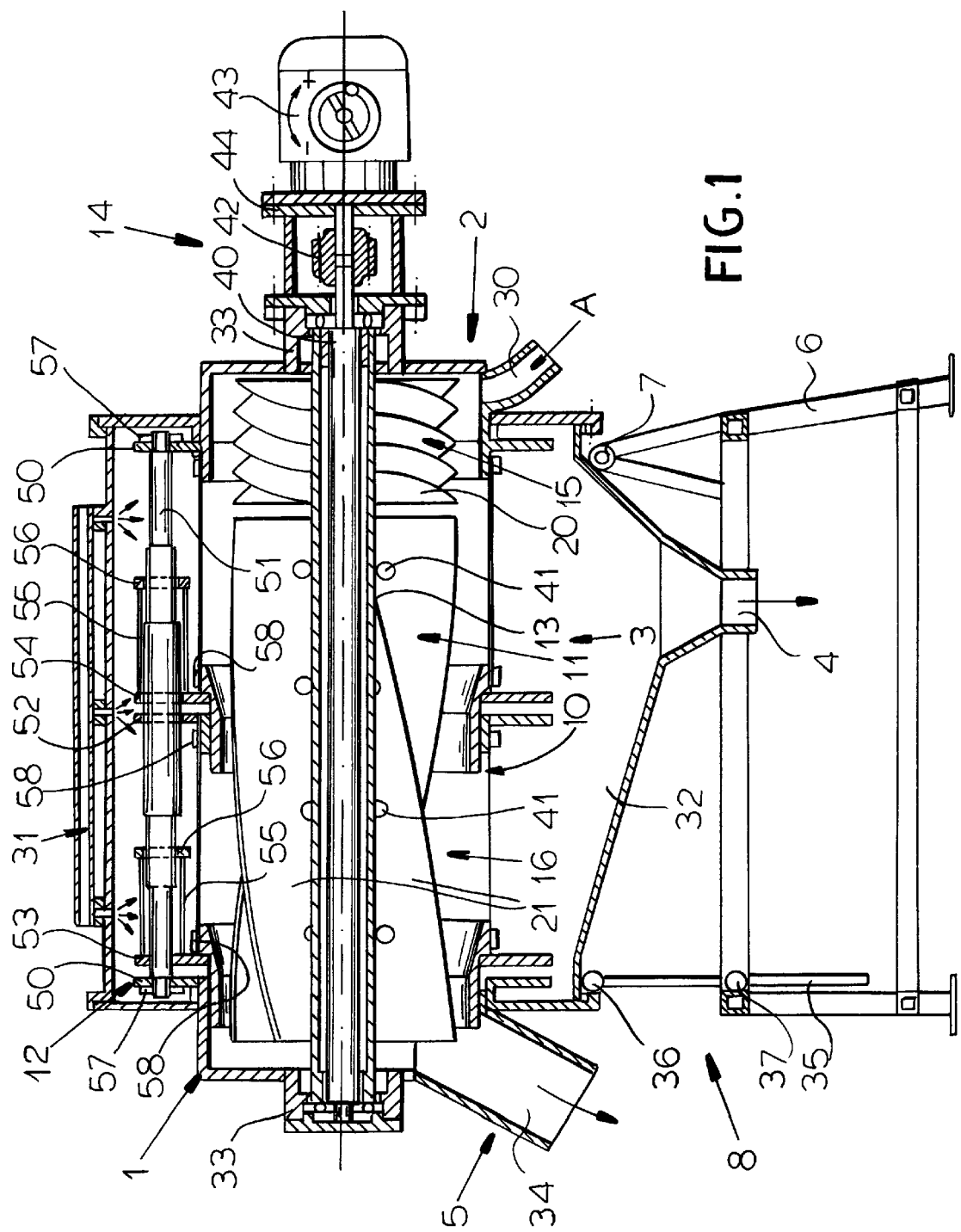
FIG. 1 shows the filter laterally and in cross section.

As shown in the accompanying drawings, the separation filter, with the impeller generating controlled turbulence for solids suspended in liquid, comprises an inclinable filter body 1 (FIG. 1) having an end where there is a feeding inlet 2 for the product to be filtrated. The middle portion said body shelters a filtrating element 3. It has a lower outlet 4 for the filtrated material and the opposite end of said filter body is equipped with an outlet 5 for solids. Said inclinable filter body 1 is mounted on a stand 6 through articulations 7 provided at its inlet end 2, and an adjustable inclination device 8 provided at its outlet end 5 for solids, thus allowing to adjust the inclination of said inclinable filter body 1 in such a way that, for example, the outlet for solids 5 might be higher than the inlet 2 of the separation filter so that the gravity might also actuate in the filtrating process, according to the characteristics of the product to be filtrated and the desired final filtrated material.

The filtrating element 3 consists of a filtrating sleeve 10, which functions together with an impeller 11. The filtrating sleeve 10 is mounted on the filter body 1 through supports 12. The inlet of said sleeve is close to inlet 2 of the filter body 1. In the middle portion said sleeve shelters a part of the winged impeller 11. The other end of said filtrating sleeve 10 is close to outlet 5 for solids of the filter body 1.

Said winged impeller 11 is equipped with an axle 13 which is subject to a motor assembly 14, located outside the filter body 1 and around it are mounted radial blades defining two phases for the impeller, namely, an inlet phase 15 close to inlet 2 of the filter body 1 and of sleeve 10, and a processing phase 16 inside sleeve 10.

Figure 3:
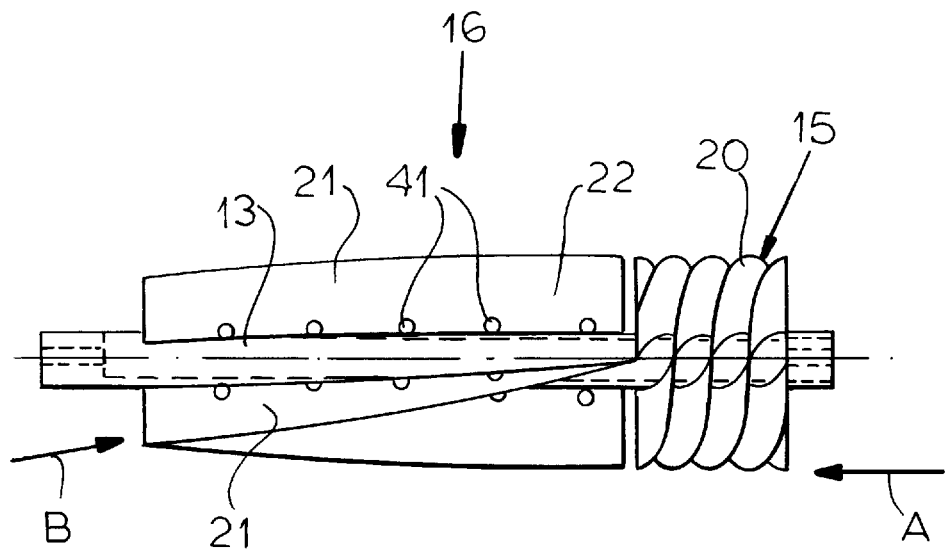
FIG. 3 shows a lateral view of the impeller.
Figure 4:
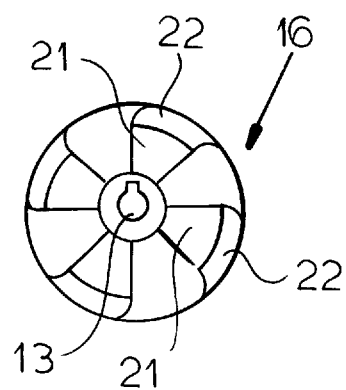
FIGS. 4 and 5 shows views from the ends of the processing and inlet portions, respectively, of the impeller.
Figure 5:
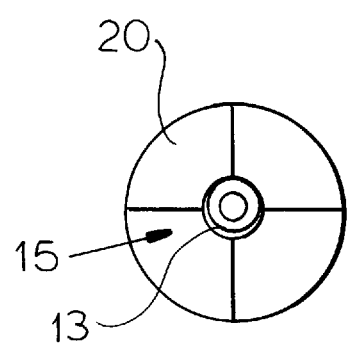
Figure 6:
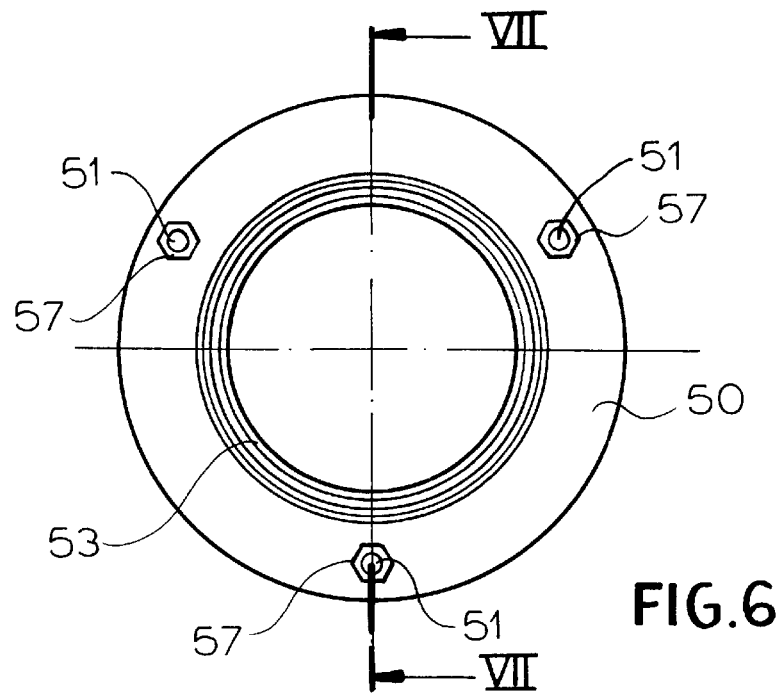
FIG. 6 shows an elastic support of the filtrating sleeve, isolated and from its end close to the outlet end for solids of the sleeve.
Figure 7:
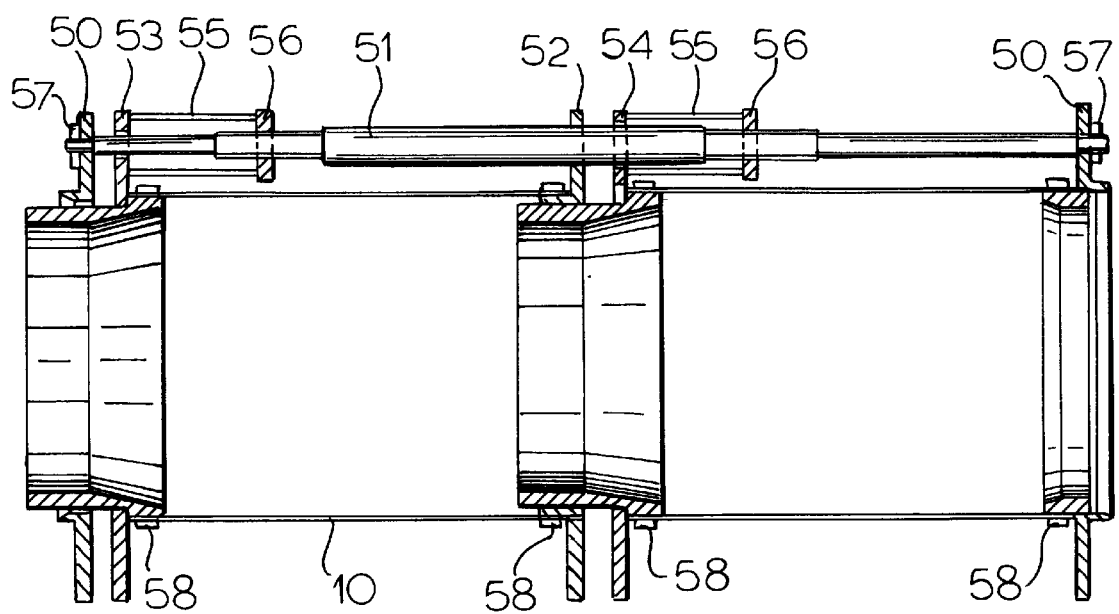
FIG. 7 shows a cross-section along plane C—C indicated in FIG. 6 the previous section.

The purpose of the present improvements is to provide, in the whole, the impeller 11 (FIGS. 3, 4 and 5) so that:

a) its inlet phase 15 consists of blades 20 in the form of a short pace propeller to give axial impulses, and no radial impulses, to the liquid to be filtrated;

b) its processing phase 16 consists of blades 21 in the form of a long pace propeller 21 to give impulses of great radial and small axial intensity to the liquid;

c) its blades 21 of the processing phase 16 with the convex dragging surface 22 for the liquid might give impulse to the material to be filtrated, which is the result from tangential components to the convex surface;

d) the system of forces on the liquid to be filtrated, coming from blades 21 in the form of a long pace propeller and from the convex dragging surface 22 of the processing phase 16 of impeller 11, might make said liquid move according to a vortex along the whole extent of the filtrating sleeve 10, which is widened in the direction of the inlet end toward the outlet end thereof, thus providing a self-cleaning effect to the filtrating sleeve 10; and e) support 12 for fixing the filtrating sleeve 10 on the filter body 1 (FIGS. 6 and 7) is elastic.

After feeding the liquid product "A" in inlet 2 of the filter body 1, the helicoidal short pace blades 20 of the inlet phase 15 of impeller drive it back with great axial intensity, and no radial intensity, to enter the processing phase 16.

In the processing phase 16, said liquid to be filtrated "A" is then driven by helicoidal long pace blades 21 with great radial intensity and small axial intensity, and, at the same time, the convex dragging surface 22 of blades 21 give an impulse to the liquid "A", which is the result from tangents to the convex surface. This system of forces moves the liquid according to a vortex along the filtrating sleeve, which is widened in the direction of the inlet towards the outlet, causing said liquid, before going through the filtrating sleeve 10, to flow down along the inner surface thereof, thus providing a hydrodynamic dragging force to the solids - washing - up to the outlet end of the filtrating sleeve 10, close to the outlet end of solids 5 of the filter body 1. The liquid going through the filtrating sleeve 10 retains the solids in the sleeve and goes out through the lower outlet 4 of said filter body 1.

In a more detailed manner, the filter body 1 comprises a casing, an end of which defines an inlet chamber 2, close to which is arranged the inlet end of the filtrating sleeve 10. Inside said inlet 2 is lodged the inlet phase 15 of impeller 11. Externally and axially installed on said inlet 2 is mounted the actuating assembly 14. In the lower part is attached to said inlet 2 a feeding nozzle 30 for the product to be filtrated.

In the middle portion, said casing of filter body 1 contains the filtrating sleeve 10 and in it there is the processing phase 16 of impeller 11, as well as parts of the elastic support 12 of the filtrating sleeve 10. In the upper part of said middle portion of the casing is the washing device 31 of the filtrating sleeve 10. The lower part of said casing defines a hopper 32 which ends up in an outlet pipe 4 for the filtrated material.

The opposite end of said casing of the filter body 1 defines an outlet chamber of solids 5 and close to it is the outlet for solids of the filtrating sleeve 10. Externally and axially, said outlet chamber of solids 5 has a bearing 33 for the axle of the actuating assembly 14. In the lower portion of said chamber 5 there is an outlet duct 34 for solids.

The adjustable inclination device 8 of the inclinable filter body 1 comprises a verticalized shaft 35, the upper end of which is connected by links and by articulation 36 to the outlet portion for solids 5 of the filter body. The middle portion of said shaft crosses and can be stabilized by a tightening bearing 37 provided in stand 6.

The filtrating sleeve 10 is preferably made of canvas (technical fabric) or sail cloth or perforated plate, the latter with suitable thickness for adapting to the elastic support 12.

Impeller 11 has helicoidal short pace blades 20 of the inlet phase 15, and helicoidal long pace blades 21 with convex dragging surface 22 of the processing phase 16, preferably, four of them, and making one piece with axle 13, which is tubular, having internal reception and it is keyed to axle 40 of the actuating assembly 14. Said convex long pace blades 21 have their base provided with holes 41 for absorbing pressure peaks from the liquid to be filtrated during the operation of the impeller.

The actuating assembly 14 comprises the actuating axle 40, the ends of which are supported on antifriction bearings 33 and 33' located at the ends of the filter body 1. The middle portion of said actuating axle 40 is internally lodged and is keyed to the tubular axle 13 which carries the helicoidal blades 20 and 21. The end of said actuating axle 40, which is at the end of inlet 2 of the filter body 1, crosses over bearing 33' and is coupled, through coupling 42, to an impulse generator 43, mounted on a reel-shaped support 44, which shelters coupling 42 and is attached to bearing 33' by screws.

The elastic support 12 for the filtrating sleeve 10 comprises farthest fixed flanged rings 50, mounted on the filter body 1 and interconnected by girders 51, regularly spaced among each other. Support 12 may contain one or more intermediate fixed flanged rings 52, according to the length of the filtrating sleeve 10. Support 12 may also include axially movable flanged rings 53 adjacent to one of the farthest fixed flanged rings 50 and intermediate ring(s) 54, adjacent to the respective intermediate fixed flanged ring(s) 52, said movable flanged rings 53 and 54 being mounted in a sliding and oscillating manner on girders 51. One of the ends of the filtrating sleeve 10 or of portion(s) of the filtrating sleeve 10 is mounted on the corresponding farthest movable flanged ring 53 or intermediate ring(s) 54. The other end of said sleeve or portion of sleeve is mounted on the corresponding intermediate fixed flanged ring(s) 52 or farthest ring 50. The farthest movable flanged rings 53 and intermediate ring(s) 54 are with their ends facing those which receive the end of sleeve or portion of sleeve adjusted in the respective farthest fixed flanged rings 50 or intermediate ring(s) 52. Said farthest movable flanged rings 53 and intermediate ring(s) 54 are arranged in a position that keeps the respective sleeve or portion of the filtrating sleeve 10 under tension through tensioning springs 55, which are arranged around the respective girders 51, inserted and pressed between the farthest movable flanged rings 53 and intermediate ring(s) 54 and pressure adjusting nuts 56, screwed on threaded portions of said girders 51.

When the liquid to be filtrated, in view of the very dynamics of the filtrating operation, causes an internal overpressure on the filtrating sleeve 10, the latter axially shrinks and the farthest movable flanged rings 53 and intermediate ring(s) 54, supporting the sleeve, slide on girders 51, against the force of the tensioning springs 55, thus allowing the sleeve to inflate radially, without significant elastic deformations, since its filtrating capacity and integrity are preserved. When the internal overpressure on the filtrating sleeve 10 ceases, the tensioning springs 55 expand and push the farthest flanged rings 53 and intermediate ring(s) 54 to their initial position. The contraction of the filtrating sleeve 10 is discontinued, and it returns to a tension position.

The farthest fixed flange rings 50 are fixed on girders 51 through nuts 57, by screwing them on girders 51. The intermediate fixed flange ring(s) is (are) fixed on girders 51 by welding. The ends of the sleeve or portions of the filtrating sleeve 10 are fixed on flanged rings by means of suitable brackets 58. Nuts 56 are screwed on girders 51 to provide a greater or lesser pressure on the tensioning springs 55, according to the filtrating operation to be performed.

The present elastic support 12, instead of being applied to the filtrating sleeve 10, comprising portions or modules of sleeve, as described above, it can be applied to a whole sleeve, and then no intermediate movable rings and no fixed flanged rings are required.

Figure 2:
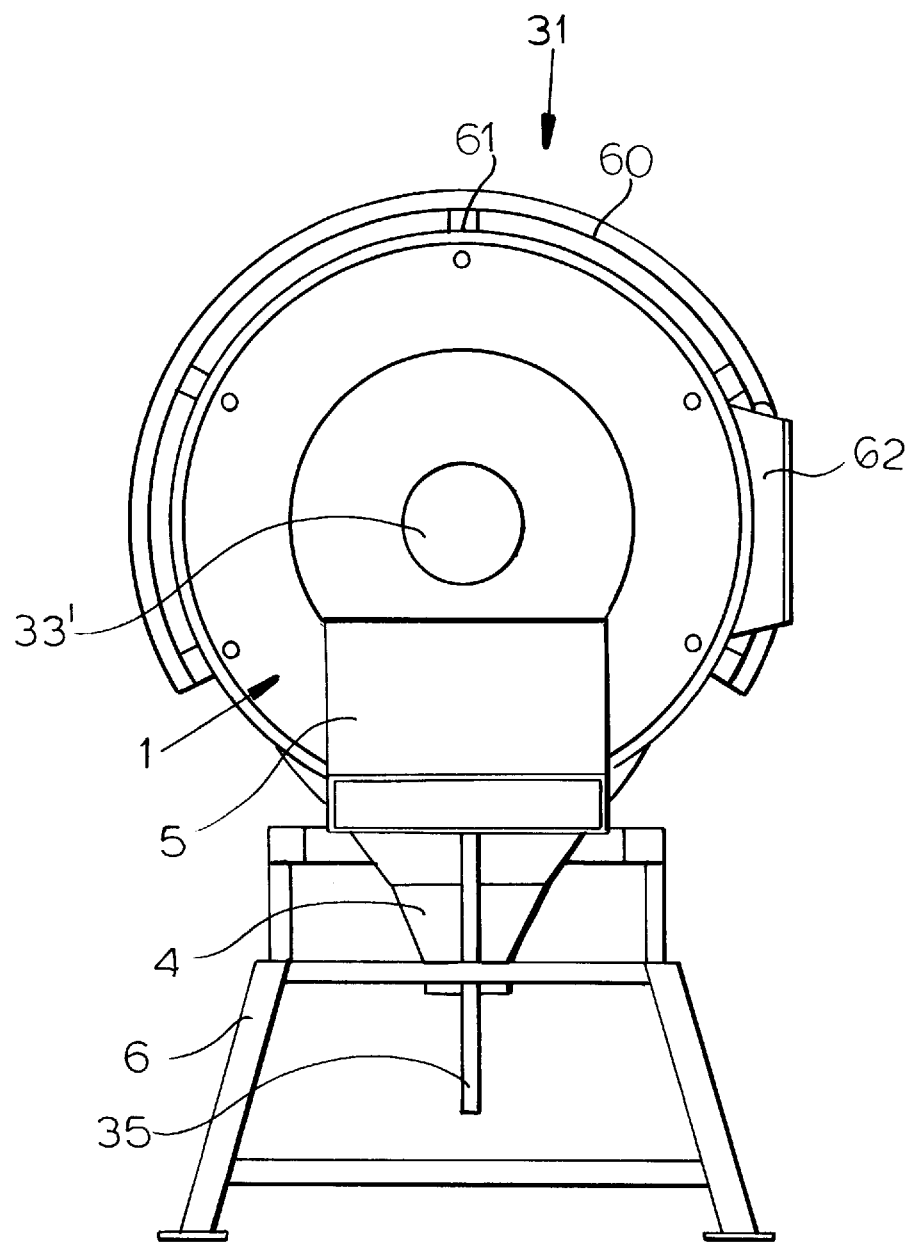
FIG. 2 shows the filter from its outlet end.

The washing device 31 of the filtrating sleeve 10 comprises a water feeding pipe 60 having distributed water injecting nipples 61 facing the inside of the filter body 1 and above the elastic support 12. Said water injecting nipples 61 inject continuous or intermittent water jets only at the beginning or at the end of a filtrating cycle, according to the product, which wash the whole surface of the filtrating sleeve 10. The operation can be seen by an operator through a lateral sight vane 62 in the filter body 1 (FIG. 2).

The entire filter body is equipped with a sealing system consisting of sealing rings and others to prevent the leakage in those portions where the liquid product or fluid to be processed is flowing.

What is claimed is:

1. A separation filter, with an impeller generating controlled turbulence for solids suspended in liquid, comprising an inclinable filter body having an inlet at one end thereof, a middle portion sheltering a filtrating element and with a lower outlet for filtrated material, and an outlet for solids, at opposite end thereof; wherein said inclinable filter body is adjustably mounted on a stand by means of articulations and an inclinable device at respective ends of said body;

the filtrating element comprises a sleeve functioning in operative cooperation with an impeller;

said filtrating sleeve is mounted on the filter body by a support and shelters a part of the impeller in a middle portion thereof; and said impeller comprises an axle, a motor assembly disposed outside the filter body and around the axle are mounted radial blades defining an inlet phase and a processing phase, lodged within the sleeve;

and comprising a washing device for the filtrating sleeve;

said impeller comprising first blades in the form of a short pace propeller to give axial impulse, and substantially no radial impulse, to the liquid to be filtrated in said inlet phase;

said impeller further comprising second blades in the form of a long pace propeller to give impulse of great radial intensity, and small axial intensity, to the liquid in said processing phase;

the second blades having convex dragging surfaces and said filtrating sleeve being widened in a direction from the inlet phase towards the outlet phase thereof for moving the liquid according to a vortex along the whole extent of the filtrating sleeve, thus providing a self-cleaning washing effect to the filtrating sleeve; and wherein said support for mounting a filtrating sleeve on said filter body is elastic.

2. A separation filter, with an impeller generating controlled turbulence for solids suspended in liquid, according to claim 1, wherein the filtrating sleeve is made of canvas, sail cloth or perforated plate.

3. A separation filter, with an impeller generating controlled turbulence for solids suspended in liquid, according to claim 1, wherein said first and second blades are helicoidal and are integral with said axle, which is tubular and connected to said motor assembly; and said second blades have their bases provided with holes for absorbing pressure peaks from the liquid to be filtrated during the operation of said impeller.

4. A separation filter with an impeller generating controlled turbulence for solids suspended in liquid according to claim 1, wherein the support for the filtrating sleeve is elastic and comprises fixed flanged rings mounted on the filter body and interconnected by girders, regularly spaced among each other and axially movable flanged rings adjacent to respective ones of the fixed flange rings, said moveable flanged rings being mounted in a sliding and oscillating manner on said girders; wherein one end of the filtrating sleeve or a portion thereof is mounted on a corresponding moveable flanged ring, and the other end of said sleeve or portion of sleeve is mounted on a corresponding fixed flange ring;

the moveable flanged rings have ends which are received in respective fixed flanged rings; and said moveable flanged rings are arranged in a position that keeps the sleeve or portion of the sleeve under tension through tensioning springs, which are arranged around the respective girders, inserted and pressed between the moveable flanged rings and pressure adjusting nuts screwed on portions of said girders.

5. A separation filter with an impeller generating controlled turbulence for solids suspended in liquids according to claim 4, wherein:

said elastic support for the filtrating sleeve further comprises additional fixed flange rings according to a length of said filtrating sleeve;

said one end of the filtering sleeve or said portion of the filtrating sleeve is also mounted on a corresponding intermediate ring and the opposite end of said sleeve or said portion of sleeve is also mounted on a corresponding intermediate fixed flange ring; and said moveable flanged rings and intermediate rings are arranged in a position that keeps the filtrating sleeve or portion of the filtrating sleeve under tension through said tensioning springs.

6. A separation filter, with an impeller generating controlled turbulence for solids suspended in liquid, according to claim 1, wherein said filtrating sleeve is flexible.

7. A separation filter, with an impeller generating controlled turbulence for solids suspended in liquid, according to claim 1, wherein outer peripheral edges of said second radial blades are provided with convex dragging surfaces.

8. A separation filter for a substance to be filtered, comprising:

a filter body having a filter element;

said filter element including a filtering sleeve and an impeller disposed within the filtering sleeve;

said filtering sleeve being mounted on said filter body by means of one or more elastic supports;

said impeller including an inlet phase comprising first blades in the form of a short pace propeller to give axial impulse, and substantially no radial impulse, to a substance to be filtered; and said impeller also including a processing phase comprising second blades in the form of a long pace propeller to give impulse of great radial intensity, and small axial intensity, to said substance to be filtered; and wherein the filtering sleeve is widened in a direction from the inlet phase toward the processing phase thereof.

9. A filter according to claim 8, wherein:

said second blades of said processing phase are provided with convex dragging surfaces which impart an impulse to said substance to be filtered, which is a result of tangential components imparted by the convex surfaces.

10. A filter according to claim 9, wherein the arrangement of said filtering sleeve being widened in a direction from the inlet phase toward the processing phase thereof, together with said convex dragging surfaces of said second blades, cause said substance to be filtered to move in a vortex along the entire extent of said filtering sleeve to provide a self-cleaning washing effect on said filtering sleeve.

11. A filter according to claim 10, wherein said impulse imparted to said substance to be filtered by said convex dragging surfaces of second blades hydrodynamically drags a solid content of said substance to be filtered along said filtering sleeve from an inlet end thereof toward an outlet end thereof.

12. A filter according to claim 9, wherein said impulse imparted to said substance to be filtered by said convex dragging surfaces of second blades hydrodynamically drags a solid content of said substance to be filtered along said filtering sleeve from an inlet end thereof toward an outlet end thereof.

13. A filter according to claim 8, wherein the arrangement of said filtering sleeve being widened in a direction from the inlet phase toward the processing phase thereof, and a configuration of said second blades of said processing phase of said impeller causes said substance to be filtered to move in a vortex along the entire extent of said filtering sleeve to provide a self-cleaning washing effect on said sleeve.

14. A separation filter according to claim 8, wherein:

said impeller further includes an axle supporting said first and second blades thereon, said first blades extending substantially concentrically about said axle, and said second blades extending substantially parallel to said axle.

15. A separation filter according to claim 8, wherein peripheral edges of said first and second blades are disposed away from said filtering sleeve by an open space.

16. A separation filter for a substance to be filtered, comprising:

a filter body having a filter element;

said filter element including a filtering sleeve and an impeller disposed within the filtering sleeve;

said filtering sleeve being mounted on said filter body by means of one or more elastic supports;

said impeller including an inlet phase comprising first blades in the form of a short pace propeller to give axial impulse, and substantially no radial impulse, to a substance to be filtered;

said impeller also including a processing phase comprising said second blades in the form of a long pace propeller to give impulse of great radial intensity, and small axial intensity to said substance to be filtered; and said second blades have holes provided in bases thereof for absorbing pressure peaks from the substance to be filtered during operation of the impeller.

\* \* \* \* \*